Patented Oct. 15, 1929

1,731,647

UNITED STATES PATENT OFFICE

JAMES H. BEATTIE, OF McLEAN, VIRGINIA, AND ALBERT M. JACKSON, OF CHEVY CHASE, MARYLAND

METHOD FOR THE PRESERVATION OF PEANUT BUTTER

No Drawing.  Application filed May 18, 1928. Serial No. 278,903.

(GRANTED UNDER THE ACT OF MARCH 3, 1883, AS AMENDED APRIL 30, 1928; 370 O. G. 757)

This application is filed under the provisions of the act approved April 30, 1928, and the invention described herein, if patented, may be manufactured and used by or for the Government for governmental purposes without the payment to us of any royalty thereon.

By our process peanut butter is made in the usual manner by shelling, roasting, blanching, or removing the inner skins, and degerming peanuts of any variety or mixture of varieties, removing all damaged or otherwise undesirable kernels, after which the peanuts are ground to any degree of fineness, using standard peanut butter machines, with the addition solely of the proper amount of salt. The peanut butter is then packed in sanitary type tin cans, screw top glass jars, or other suitable containers which may be sealed air-tight, and sealed. The containers are then placed in a pressure canning retort, of standard construction which is closed, steam admitted to the retorts, the air forced out and the containers processed under steam pressure for a period of time and under a pressure and a temperature determined by the size and type of the packages being employed. Number two tin cans and eight ounce mayonnaise jars require about fifteen minutes at fifteen pounds or 250 degrees Fahrenheit, smaller or larger containers for periods varying in proportion to their size. The processing causes the peanut butter to stiffen. The degree of stiffness can be controlled within certain limits by decreasing or increasing the time of the process. In this work it was found that a fifteen minute process at 250 degrees Fahrenheit for No. 2 cans or eight ounce mayonnaise jars gave a desirable degree of stiffness with prevention of separation of oil.

By this method the keeping quality of peanut butter is improved and it may be kept under ordinary storage for long periods, two years or more, without the development of rancidity or the separation of oil from the solid matter.

We claim:

1. A process for the preservation of peanut butter so as to prevent the subsequent separation of oil and solid which consists in sealing the peanut butter in air-tight containers and in subjecting said containers to the action of steam under pressure.

2. A process for the preservation of peanut butter so as to prevent the subsequent separation of oil and solid which consists in sealing the peanut butter in air-tight containers and in subjecting said containers to the action of steam under pressure and at a temperature of about 250 degrees Fahrenheit.

3. A process for the preservation of peanut butter so as to prevent the subsequent separation of oil and solid which consists in sealing the peanut butter in air-tight containers and in subjecting said containers to the action of steam under pressure and at a temperature of about 250 degrees Fahrenheit for a period of about fifteen minutes.

JAMES H. BEATTIE.
ALBERT M. JACKSON.